United States Patent [19]

Kanai et al.

[11] Patent Number: 4,806,510

[45] Date of Patent: Feb. 21, 1989

[54] SILICON NITRIDE SINTERED BODY AND METHOD FOR PRODUCING SAME

[75] Inventors: Tsuneyuki Kanai; Tadahiko Miyoshi, both of Hitachi, Japan

[73] Assignee: Hitachi, Ltd., Tokyo, Japan

[21] Appl. No.: 44,203

[22] Filed: Apr. 30, 1987

[30] Foreign Application Priority Data

Apr. 30, 1986 [JP] Japan ................................. 61-98282

[51] Int. Cl.$^4$ .............................................. C04B 35/58
[52] U.S. Cl. ........................................ 501/97; 501/98
[58] Field of Search .................... 501/97, 98; 264/65; 51/307, 308, 309

[56] References Cited

U.S. PATENT DOCUMENTS

| | | | |
|---|---|---|---|
| 4,234,343 | 11/1980 | Andersson et al. | 501/97 |
| 4,351,787 | 9/1982 | Martinengo et al. | 264/65 |
| 4,511,402 | 4/1985 | Miura et al. | 501/97 |
| 4,650,498 | 3/1987 | Buljan | 51/308 |
| 4,652,276 | 3/1987 | Burden | 51/308 |

FOREIGN PATENT DOCUMENTS 116671 9/1980 Japan.
140076 11/1981 Japan.
208182 12/1983 Japan.
61-197468 9/1986 Japan.

OTHER PUBLICATIONS

*Chemical Abstracts,* "Silicon Nitride Sintered Body With High Strength and Improved Oxidation Resistance", Yokoyama, vol. 106 No. 20, Abstract No. 161431p, May 18, 1987, p. 324.

*Journal of the American Ceramic Society,* Mieskowski et al, "Oxxidation of Silicon Nitride Sintered With Rare-Earth Oxide Additions", vol. 68, No. 7, Jul. 1985, pp. C-160-C-163.

*Primary Examiner*—William R. Dixon, Jr.
*Assistant Examiner*—Anthony J. Green
*Attorney, Agent, or Firm*—Antonelli, Terry & Wands

[57] ABSTRACT

There is obtained, by mixing oxide raw material powders, compacting the mixture and sintering the compact, a silicon nitride sintered body mainly composed of silicon nitride and having a grain boundary phase wherein crystals represented by $Yb_2Si_2O_7$ and a $Zr_3Yb_4O_{12}$ are present in the grain boundary phase and molar ratio $ZrO_2/Yb_2O_3$ in terms of $ZrO_2$ and $Yb_2O_3$ is 2/98 to 75/25 and the total amount of $ZrO_2$ and $Yb_2O_3$ is 1-40% by weight of the sintered body.

18 Claims, 1 Drawing Sheet

SILICON NITRIDE SINTERED BODY AND METHOD FOR PRODUCING SAME

BACKGROUND OF THE INVENTION

This invention relates to a silicon nitride sintered body and more particularly, to a silicon nitride sintered body that shows a small reduction of strength at room temperature and at high temperatures and that shows superior oxidation resistance. Furthermore, the invention relates to a method for making the same.

Hitherto, various heat resistant metallic alloys have been used as materials for gas turbines, heat exchangers, etc. However, recently, the use of various ceramics in place of these alloys has been attempted under severer conditions, which these alloys cannot stand, especially at high temperatures of 1000° C. or higher for purposes of improvement of thermal efficiency and energy saving. Among those ceramics, a silicon nitride ($Si_3N_4$) sintered body has been noticed as a structural material along with a silicon carbide (SiC) sintered body owing to its superior strength, wear resistance and oxidation resistance, small coefficient value of thermal expansion, excellent strength at high temperatures and chemical stability.

Development of ceramic gas turbines has been made, according to which improvement of thermal efficiency of gas turbines is attained by using ceramics of excellent heat resistance in place of the conventional heat resistant alloys. Characteristics required for ceramic materials used for gas turbines are as follows:

(1) They must have high strength at high temperatures so that they can stand strong centrifugal force due to high-speed rotation at high temperatures.

(2) They must withstand thermal shock at combustion and at stopping.

(3) They must withstand strong oxidation conditions at high temperatures.

All of these conditions must be satisfied for practical use.

As materials of the gas turbines, SiC and $Si_3N_4$ materials have been studied, but SiC has problems in the above (1) and (2) and $Si_3N_4$ has problems in (1) and (3).

Silicon nitride itself is poor in sinterability because of its covalent bonding and hence it is difficult to obtain a sintered body with high density and high strength from silicon nitride along. Therefore, it has been attempted to add $Al_2O_3$, MgO and oxides of rare earth elements during sintering of silicon nitride as a sintering aids. The added sintering aid reacts with $SiO_2$ present on the surface of silicon nitride powder in the sintering process to form a glass phase of low melting point and accelerate sintering, whereby the final sintered body is composed of silicon nitride and a grain boundary phase.

Therefore, in order to obtain sintered bodies that exhibit high strength at high temperature and superior oxidation resistance, the sintering aids used must have a sintering acceleration effect, and also must form a grain boundary phase with high strength at high temperature and further form an oxide film good in oxidation resistance.

Many proposals have been made for silicon nitride sintered bodies excellent in mechanical strength and oxidatin resistance.

Japanese Patent Kokai (Laid-Open) No. 197468/86 discloses a silicon nitride sintered body comprising at least 80 wt% (of the total) of β-silicon nitride and the balance being a solid solution of zirconia and ytterbium oxide as a grain boundary phase. This grain boundary phase is composed of a solid solution of 1–10 mol% of ytterbium dissolved in zirconia. According to this patent publication, when the amount of ytterbium oxide is outside the above range, oxidation resistance at high temperatures is deteriorated, sinterability is poor and densification is difficult.

Japanese Patent Kokai (Laid-Open) No. 116671/80 discloses a method of improving high-temperature strength which comprises adding $Al_2O_3$ or AlN and rare earth oxide to silicon nitride to form a grain boundary phase composed of crystal of $Si_3N_4 \cdot R_2O_3$ [R represents an element of group IIIa (scandium series) of the periodic table] type structure to make a material with high strength at high temperature. According to this method, for example, when y (yttrium) is employed as the element of Group IIIa, $Si_3N_4 \cdot Y_2O_3$ is precipitated as a grain boundary phase to provide a high strength at three-point bending of about 110 Kg/mm$^2$ at room temperature and 1200° C., but there is a problem in oxidation resistance. This method is characterized by precipitation of $Si_3N_4 \cdot R_2O_3$ (R is an element of Group IIIa of the periodic table) as grain boundary phase to improve high-temperature strength, but evaluation of oxidation resistance has revealed that a great increase in weight of about 2.0 mg/cm$^2$ is caused in oxidation test at 1300° C. for 300 hours. Thus, there is a problem in use of this material at high temperatures where characteristics of silicon nitride can be actually exhibited.

SUMMARY OF THE INVENTION

It is an object of this invention to provide a silicon nitride sintered body excellent in mechanical strength at room temperature and high temperatures and good oxidation resistance.

Another object of this invention is to provide a method for producing said silicon nitride sintered body.

According to this invention, there is provided a silicon nitride sintered body mainly composed of silicon nitride and having a grain boundary phase wherein crystals represented by $Yb_2Si_2O_7$ and $Zr_3Yb_4O_{12}$ are present in said grain boundary phase, the molar ratio $ZrO_2/Yb_2O_3$ in terms of $ZrO_2$ and $Yb_2O_3$ is 2/98 to 75/25, preferably 25/75 to 75/25 and the total amount of $ZrO_2$ and $Yb_2O_3$ is 1–40 wt%, preferably 1–20 wt% of the whole sintered body.

Furthermore, according to this invention, there is provided a silicon nitride sintered body mainly composed of silicon nitride which has a grain boundary phase and has a dense oxide film on the surface, wherein crystals represented by $Yb_2Si_2O_7$ and $Zr_3Yb_4O_{12}$ are present in the grain boundary phase, the total amount of $ZrO_2$ and $Yb_2O_3$ in terms of $ZrO_2$ and $Yb_2O_3$ is 1–40% by weight of the whole sintered body, said dense oxide film is mainly composed of α-cristobalite and $Yb_2Si_2O_7$ and the molar ratio $ZrO_2/Yb_2O_3$ is 2/98–75/25, preferably, 25/75/75/25.

This invention further provides a method for making the silicon nitride sintered body which comprises mixing a silicon nitride powder with a zirconium oxide powder and a ytterbium oxide powder or a powder of composite oxide of zirconium and ytterbium so that the molar ratio $ZrO_2/Yb_2O_3$ is 2/98 to 75/25 and the total amount of the two oxides is 1–40% by weight of the whole silicon nitride sintered body, then compacting the mixed powder and sintering this compact at a sufficient temperature and for a sufficient period in a non-oxidizing atmosphere.

DETAILED DESCRIPTION OF PREFERRED EMBODIMENTS OF THE INVENTION

Figure 1:
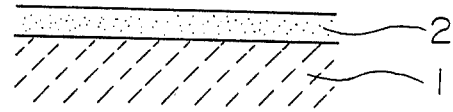
FIG. 1 is a diagrammatical sectional view of the oxide film of the sintered body of this invention upon service application.

The inventors have studied various sintering aids which have a sintering acceleration effect and which can form a grain boundary phase having both high-temperature strength and the oxidation resistance. As a result, it has been found that when zirconium oxide and ytterbium oxide are used as sintering aids, (1) in the sintered body there are precipitated at grain boundary a $Yb_2Si_2O_7$ crystal produced by the reaction of $SiO_2$ on the surface of $Si_3N_4$ with the sintering aids and a $Zr_3Yb_4O_{12}$ crystal produced by the reaction of sintering aids per se, resulting in less reduction of strength at high temperatures and (2) a dense oxide film mainly composed of $\alpha$-cristobalite and $Yb_2Si_2O_7$ is formed on the surface oxidized at high temperatures on service. Thus oxidation resistance is greatly improved and under some conditions there is obtained $Si_3N_4$ superior in oxidation resistance to SiC which has been known to be especially excellent in oxidation resistance.

According to this invention, in order to obtain materials having both high strength at high temperature and excellent oxidation resistance, it is preferred to contain in the silicon nitride 1–40% by weight (of the whole sintered body) of zirconium oxide and ytterbium oxide at a molar ratio ($ZrO_2/Yb_2O_3$) of 2/98 to 75/25, more preferably 25/75 to 75/25. The materials having the above characteristics can be obtained only by using the sintering aids of the above composition.

The reasons the above compositional ranges are preferred are as follows:

(1) Re: The blending ratio (molar ratio) of zirconium oxide/ytterbium oxide is 2/98 to 75/25.

When zirconium oxide is blended at less than the ratio of 2/98, the composition is close to the composition of ytterbium along as a sintering aid, resulting in a great reduction of high-temperature strength and deterioration of oxidation resistance due to formation of a porous oxide film. When the ratio is more than 75/25, the composition is close to the composition of zirconium oxide alone and thus oxidation resistance is improved, but sintering progresses with difficulty, density is not increased and sintered bodies of high strength cannot be obtained. Therefore, the above range is employed.

(2) Re: The total amount of zirconium oxide and ytterbium oxide is 1–40% by weight, preferably 1–20% by weight of the whole sintered body.

When the total amount is less than 1% by weight, the amount of sintering aid is insufficient and hence sintering property is deteriorated and a dense sintered body cannot be obtained. When more than 40% by weight, the amount of the grain boundary phase increases and strength at room temperature decreases. Thus, the range of 1–40% by weight is employed.

The particle size of silicon nitride, zirconium oxide and ytterbium oxide is preferably 10 $\mu$m or less. When it is more than 10 $\mu$m, the composition becomes microscopically heterogeneous and not only the densification at sintering is inhibited, but also sintering of longer time is required for formation of the desired grain boundary phase. Furthermore, the purity of these raw material powders is desirably at least 99% because an impurity component tends to form a glass phase which reduces high-temperature strength of the sintered body.

With reference to sintering methods, hot-pressing has been referred to hereinbefore, but any other methods such as pressureless sintering, sintering in pressured atmosphere, HIP (hot isostatic pressing), etc. commonly employed by one skilled in the art may also be used for obtaining the product of this invention.

For producing the silicon nitride sintered body of this invention, powders mainly composed of silicon nitride and further containing 1–40% by weight, preferably 1–20% by weight (of the whole sintered body) of zirconium oxide and ytterbium oxide at a molar ratio ($ZrO_2/Yb_2O_3$) of 2/98 to 75/25, preferably 25/75 to 75/25 are mixed and pulverized and thereafter are compacted to obtain a powder compact, which is then sintered at 1600°–1950° C. in a non-oxidizing atmosphere. The mixing and pulverizing of the powders may be carried out, for example, by a ball mill and the like and the compacting may be carried out, for example, by a rubber press and the like preferably under a pressure of about 1 ton/cm$^2$.

The compact is subjected to pressureless sintering or hot-pressing at a temperature of 1600°–1950° C. When the sintering temperature is lower than 1600° C., a sufficiently densified sintered body cannot be obtained and when higher than 1950° C., thermal decomposition of silicon nitride per se occurs violently and a sound sintered body cannot be obtained. Further, a sintering time of at least 30 minutes, desirably about 2 hours is necessary in order to completely precipitate $Yb_2Si_2O_7$ and $Zr_3Yb_4O_{12}$ crystal phases at the grain boundaries. The cooling rate after sintering is suitably 20° C./min or less so that the glass phase remains in grain boundary as little as possible.

The silicon nitride sintered body thus obtained using zirconium oxide and ytterbium oxide as a sintering aids shows substantially no change of strength between room temperature and 1300° C. and has a high strength of about 100 Kg/mm$^2$. Thus, this can be used as a high-temperature structural member of superior oxidation resistance.

The silicon nitride sintered body of this invention is most suitable as materials for gas turbines because of its high strength at room temperature and at high temperature and excellent oxidation and thermal shock resistance.

This invention makes it possible to produce a sintered body having characteristics markedly superior to those of conventional products in high-temperature strength and oxidation resistance by using zirconium oxide and ytterbium oxide at a molar ratio of 2/98 to 75/25 as sintering aids. The high strength at high temperature can be attained due to the precipitation of highly heat resistant $Yb_2Si_2O_7$ and $Zr_3Yb_4O_{12}$ crystals in the grain boundary phase, melting points of which are 1850° C. and 2800° C., respectively, which are higher than the melting point (1825° C.) of the conventional $Si_3N_4 \cdot Y_2O_3$. Thus, the high-temperature strength is higher than that of conventional materials.

Figure 2:
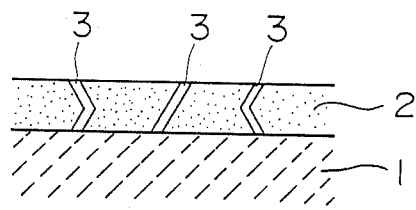
FIG. 2 is a diagrammatical sectional view of the oxide film of a conventional sintered body.

On the other hand, when subjected to oxidation at high temperatures, the oxide film of conventional materials becomes porous (i.e., having pores) as shown in FIG. 2. FIG. 2 is a diagrammatical cross-sectional view of an oxide film of conventional material, wherein numeral 1 indicates silicon nitride material, 2 indicates a dense oxide film and 3 indicates pores. Therefore, the weight increment upon oxidation increases in propor- 1300° C. Test pieces prepared in the same manner as for the bending test pieces were put on an alumina boat and kept at 1300° C. for 300 hours in an electric furnace. Changes in weight before and after the treatment in the electric furnace were measured to evaluate oxidation resistance. The results are shown in Table 1.

TABLE 1

| | Compositions | | | Properties of sintered body | | |
|---|---|---|---|---|---|---|
| | | | | Bending strength at room | Bending strength at | Oxidation weight increment (mg/cm$^2$) |
| Sample No. | Si$_3$N$_4$ (wt %) | ZrO$_2$ + Yb$_2$O$_3$ (wt %) | ZrO$_2$/Yb$_2$O$_3$ (mol %/mol %) | temp. (Kg/mm$^2$) | 1300° C. (Kg/mm$^2$) | 1300° C., 300 hrs |
| 1 (This invention) | 99 | 1.0 | 66.7/33.3 | 115 | 110 | 0.04 |
| 2 (This invention) | 80 | 20 | 66.7/33.3 | 123 | 107 | 0.03 |
| 3 (This invention) | 60 | 40 | 66.7/33.3 | 105 | 101 | 0.05 |
| 4 (Comparative Example) | 99.5 | 0.5 | 66.7/33.3 | 70 | 67 | 0.03 |
| 5 (Comparative Example) | 55 | 45 | 66.7/33.3 | 75 | 63 | 0.04 | tion to oxidation time and when the material is subjected to a long time oxidation test, the oxidation weight increment becomes very large and such material cannot be put to practical use. On the other hand, in the case of the material of this invention, the oxide film formed in service comprises cristobalite and a composition mainly composed of Yb$_2$Si$_2$O$_7$ and is dense as shown in FIG. 1, which is a diagrammatical cross-sectional view of the oxide film of the material of this invention and numerals 1 and 2 indicate the same portions as in FIG. 2. Therefore, when the oxidation weight increment is shown on an ordinate axis and time is on abscissa axis in a logarithmic graph, the gradient is closer to ½ and this indicates that behavior of oxygen on the surface of the sintered body depends on diffusion controlled-determination. Therefore, when the material is subjected to a long time oxidation test, the oxidation weight increment is much smaller than that of conventional materials.

The following nonlimiting examples further explain this invention.

EXAMPLE 1

Zirconium oxide (ZrO$_2$) having an average particle size of 0.05 μm and a purity 99.9% and ytterbium oxide (Yb$_2$O$_3$) of average particle size of 3 μm and a purity of 99.9% were blended at a molar ratio of 66.7:33.3. This powder blend was mixed with silicon nitride powder of having an average particle size 0.6 μm so that content of the former was 0.5, 1.0, 20, 40 and 45% by weight of the total amount. The resultant compositions were sample Nos. 1-5 shown in Table 1.

Each composition was pulverized and mixed in a ball mill for 48 hours and compacted under a pressure of 1000 Kg/cm$^2$. Then, this compact was subjected to hot-pressing in a nitrogen atmosphere of 1 atm at 1850° C. under a pressure of 300 Kg/cm$^2$ for 2 hours. A test piece of 3×4×40 mm was cut out from this sintered body. The surface of the test piece was polished and then this was subjected to three-point bending test at a span of 30 mm and a cross-head speed of 0.5 mm/min to measure bending strengths at room temperature and at It is recognized from Table 1 that high strength silicon nitride sintered bodies having a bending strength higher than 100 Kg/mm$^2$ at both room temperature and at high temperature were obtained with addition of sintering aid of the composition of ZrO$_2$/Yb$_2$O$_3$=66.7/33.3 (molar ratio) to silicon nitride in an amount of 1-40% by weight of the total weight and thus obtained sintered bodies showed very small oxidation weight increment after treatment at 1300° C. for 300 hours and this oxidation weight increment was further smaller than the addition amount of the sintering aids was 1-20% by weight.

Figure 3:
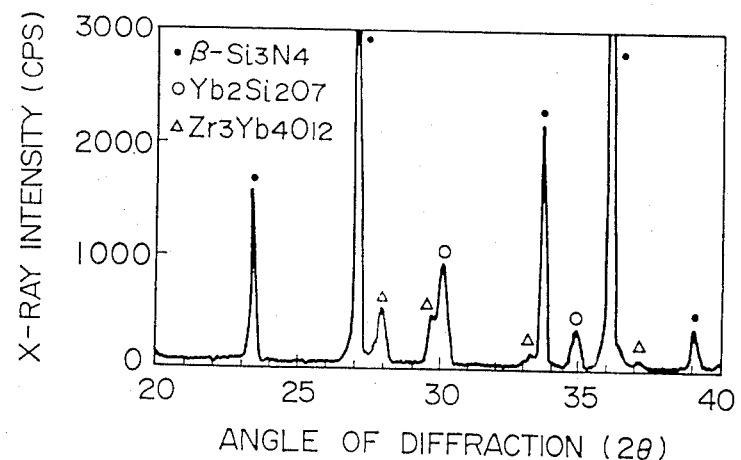
FIG. 3 is a graph of the X-ray diffraction of the sintered body of this invention.

FIG. 3 shows X-ray diffraction pattern of Sample No. 2, the material of this invention, wherein the abscissa shows diffraction angle 2θ, the ordinate shows X-ray intensity (cps), black circles show β-Si$_3$N$_4$, white circles show Yb$_2$Si$_2$O$_7$ and white triangle marks show Zr$_3$Yb$_4$O$_{12}$. The material of this invention contains β-Si$_3$N$_4$ and Yb$_2$Si$_2$O$_7$ and Zr$_3$Yb$_4$O$_{12}$ crystals and the improvement is high-temperature strength is due to the precipitation of these Yb$_2$Si$_2$O$_7$ and Zr$_3$Yb$_4$O$_{12}$ crystals. The oxide film after subjecting the material to an oxidation test at 1300° C. for 300 hours was examined to detect cristobalite and Yb$_2$Si$_2$O$_7$. The small oxidation weight increment in this case is due to this dense oxide film.

EXAMPLE 2

Example 1 was repeated except that the ratio of zirconium oxide and ytterbium oxide was changed as indicated in Table 2 and addition amount of them was 4% by weight of the total weight. The bending strength at room temperature and at 1300° C. in the same manner as was measured for the thus obtained sintered bodies in Example 1. The oxidation weight increment after treatment at 1300° C. for 300 hours was also measured as was measured for the thus obtained sintered bodies in Example 1. The results are shown in Table 2.

Results obtained when lanthanum oxide and gadolinium oxide were used in place of ytterbium oxide are shown in Table 3.

TABLE 2

| Sample No. | Compositions Si$_3$N$_4$ (wt %) | ZrO$_2$ + Yb$_2$O$_3$ (wt %) | ZrO$_2$/Yb$_2$O$_3$ (mol %/mol %) | Properties of sintered body Bending strength at room temp. (Kg/mm$^2$) | Bending strength at 1300° C. (Kg/mm$^2$) | Oxidation weight increment (mg/cm$^2$) 1300° C., 300 hrs |
|---|---|---|---|---|---|---|
| 6 (This invention) | 96.0 | 4.0 | 2/98 | 121 | 95 | 0.08 |
| 7 (This invention) | 96.0 | 4.0 | 25/75 | 115 | 118 | 0.06 |
| 8 (This invention) | 96.0 | 4.0 | 50/50 | 103 | 108 | 0.04 |
| 9 (This invention) | 96.0 | 4.0 | 75/25 | 101 | 100 | 0.03 |
| 10 (Comparative Example) | 96.0 | 4.0 | 90/10 | 97 | 93 | 0.01 |
| 11 (Comparative Example) | 96.0 | 4.0 | 1/99 | 107 | 81 | 1.0 |
| 12 (Comparative Example) | 96.0 | 4.0 | 95/5 | 63 | 60 | 0.02 |

TABLE 3

| Sample No. | Compositions Si$_3$N$_4$ (wt %) | ZrO$_2$ + La$_2$O$_3$ or Gd$_2$O$_3$ (wt %) | ZrO$_2$/La$_2$O$_3$ or Gd$_2$O$_3$ (mol %/mol %) | Properties of sintered body Bending strength at room temp. (Kg/mm$^2$) | Bending strength at 1300° C. (Kg/mm$^2$) | Oxidation weight increment (mg/cm$^2$) 1300° C., 300 hrs |
|---|---|---|---|---|---|---|
| 13 (Comparative Example) | 96.0 | 4.0 (La) | 50/50 | 97 | 85 | 0.05 |
| 14 (Comparative Example) | 96.0 | 4.0 (Gd) | 50/50 | 90 | 80 | 0.07 |

It is recognized from Table 2 that when the molar ratio ZrO$_2$/Yb$_2$O$_3$ is within the range of 2/98–75/25, the resulting sintered body has high strength at room temperature and at 1300° C. and is further excellent in oxidation resistance. On the other hand, it is also recognized that Sample Nos. 10, 11 and 12 which are outside the range of this invention in molar ratio are inferior to the product of this invention in some of room-temperature strength, 1300° C. strength and oxidation resistance.

Furthermore, it is seen from Table 3 that when oxides of rare earth elements other than ytterbium are used, effects similar to the excellent effects attained using ytterbium oxide cannot be obtained.

EXAMPLE 3

A sintered body was obtained in the same manner as in Example 1 except that about 10% by weight of Yb$_2$Zr$_2$O$_7$ was added to Si$_3$N$_4$ in place of zirconium oxide and ytterbium oxide. The oxidation weight increment of the obtained sintered body after treatment at 1500° C. for 20 hours in air was 0.06 mg/cm$^2$, which was smaller than the oxidation weight increment 0.1 mg/cm$^2$ of a SiC sintered body. Furthermore, this sintered body had a strength higher than 100 Kg/cm$^2$ between room temperature and 1300° C. and was higher in toughness and thermal shock resistance.

As explained above, according to this invention, there can be obtained silicon nitride sintered bodies superior in mechanical strength at room temperature and at high temperatures and good in oxidation resistance characteristics. Thus, structural materials for use at high temperatures such as for parts of gas turbines which require high reliability can be easily made from said these sintered bodies.

What is claimed is:

1. A silicon nitride sintered body consisting essentially of silicon nitride crystal grains and a grain boundary phase of crystals represented by Yb$_2$Si$_2$O$_7$ and Zr$_3$Yb$_4$O$_{12}$, said silicon nitride sintered body being produced by sintering an admixture consisting essentially of silicon nitride, zirconium oxide and ytterbium oxide, wherein a molar ratio of ZrO$_2$/Yb$_2$O$_3$ in terms of the total amount of ZrO$_2$ and Yb$_2$O$_3$ is 2/98 to 75/25 and said total amount of ZrO$_2$ and Yb$_2$O$_3$ is 1–40% by weight of said admixture.

2. A silicon nitride sintered body according to claim 1, wherein said molar ratio of ZrO$_2$/Yb$_2$O$_3$ is 25/75 to 75/25.

3. A silicon nitride sintered body according to claim 1, wherein said total amount of ZrO$_2$ and Yb$_2$O$_3$ is 1–20% by weight of said admixture.

4. A silicon nitride sintered body consisting essentially of silicon nitride crystal grains and a grain boundary phase of crystals represented by Yb$_2$Si$_2$O$_7$ and Zr$_3$Yb$_4$O$_{12}$, and a dense oxide film on the surface of said sintered body, said sintered body being produced by sintering an admixture consisting essentially of silicon nitride, zirconium oxide and ytterbium oxide, wherein a molar ratio of ZrO$_2$/Yb$_2$O$_3$ in terms of the total amount of ZrO$_2$ and Yb$_2$O$_3$ is 2/98 to 75/25, the total amount of ZrO$_2$ and Yb$_2$O$_3$ is 1–40% by weight of said admixture and said dense oxide film consists essentially of α-cristobalite and Yb$_2$Si$_2$O$_7$.

5. A silicon nitride sintered body according to claim 4, wherein said molar ratio ZrO$_2$/Yb$_2$O$_3$ is 25/75 to 75/25.

6. A silicon nitride sintered body according to claim 4, wherein said total amount of $ZrO_2$ and $Yb_2O_3$ is 1-20% by weight of said admixture.

7. A method for producing a silicon nitride sintered body consisting essentially of silicon nitride crystal grains and a grain boundary phase of crystals represented by $Yb_2Si_2O_7$ and $Zr_3Yb_4O_{12}$, which comprises mixing silicon nitride powder with zirconium oxide powder and ytterbium oxide powder or with powder of a composite oxide of zirconium and ytterbium to form a mixed powder so that the total amount of zirconium oxide and ytterbium oxide is 1-40% by weight of said mixed powder with a molar ratio of $ZrO_2/Yb_2O_3$ in terms of the total amount of $ZrO_2$ and $Yb_2O_3$ being 2/98 to 75/25, compacting said mixed powder to form a compact and the sintering said compact in a non-oxidizing atmosphere.

8. A method according to claim 7, wherein the particle size of the powders is 10 $\mu$m or less.

9. A method according to claim 7 wherein said molar ratio of $ZrO_2/Yb_2O_3$ is 25/75 to 75/25.

10. A method according to claim 7, wherein said total amount of $ZrO_2$ and $Yb_2O_3$ is 1-20% by weight of said mixed powder.

11. A method according to claim 7, wherein said compact is sintered by heating at a temperature of 1600°-1950° C.

12. A method according to claim 7, wherein said compact is sintered for a time of 0.5-2 hours.

13. A method according to claim 7, wherein said sintering is carried out by hot-pressing, pressureless sintering, sintering in a pressured atmosphere or hot isostatic pressing.

14. A method according to claim 7, wherein said composite oxide is $Yb_2Zr_2O_7$.

15. A silicon nitride sintered body according to claim 1, wherein said admixture is prepared by mixing a silicon nitride powder with a zirconium oxide powder and a ytterbium oxide powder.

16. A silicon nitride sintered body according to claim 1, wherein said admixture is prepared by mixing a silicon nitride powder with a powder of a composite oxide of zirconium and ytterbium.

17. A silicon nitride sintered body according to claim 4, wherein said admixture is prepared by mixing a silicon nitride powder with a zirconium oxide powder and a ytterbium oxide powder.

18. A silicon nitride sintered body according to claim 4, wherein said admixture is prepared by mixing a silicon nitride powder with a powder of a composite oxide of zirconium and ytterbium.

* * * * *